Patented Feb. 1, 1938

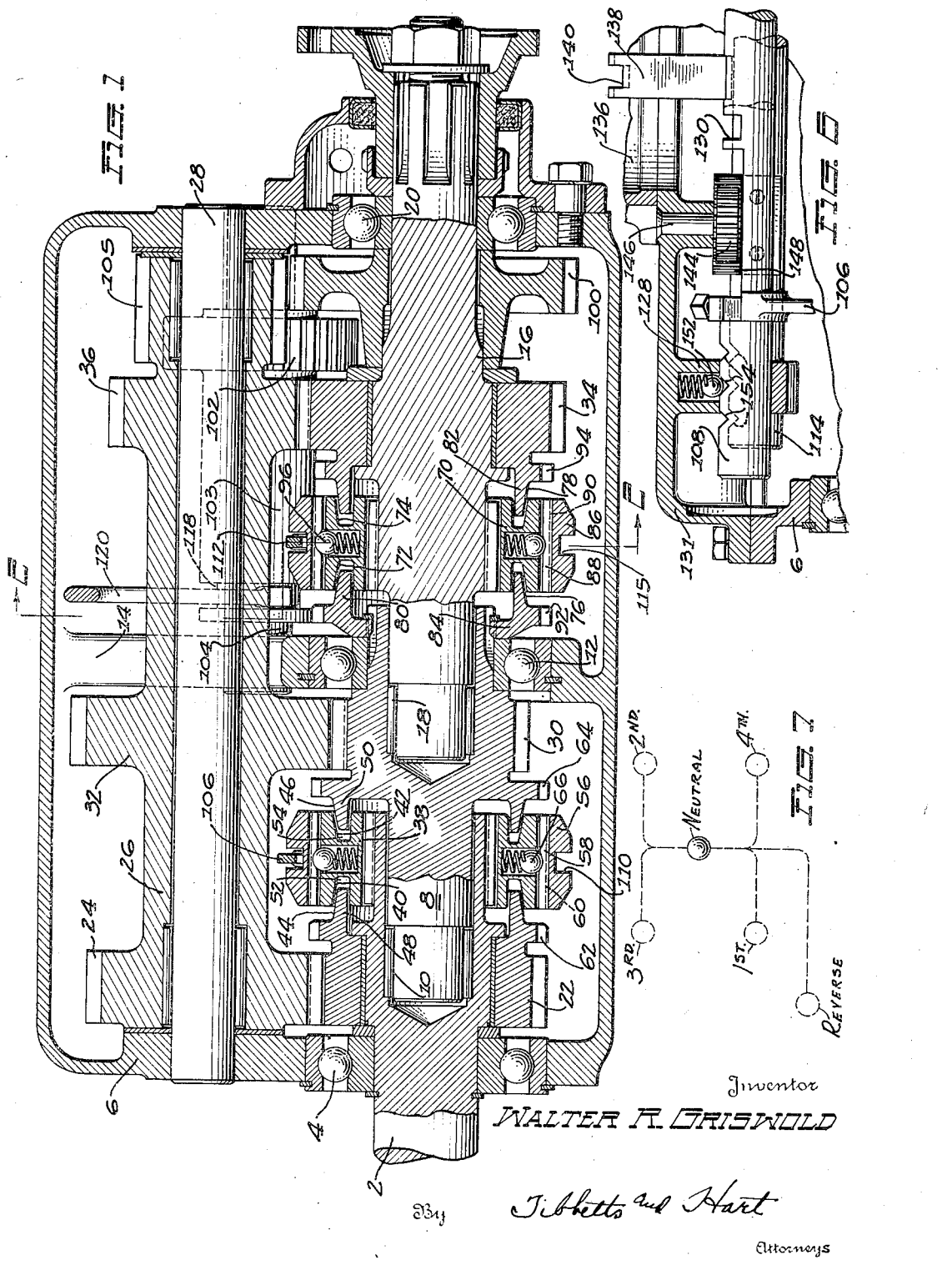

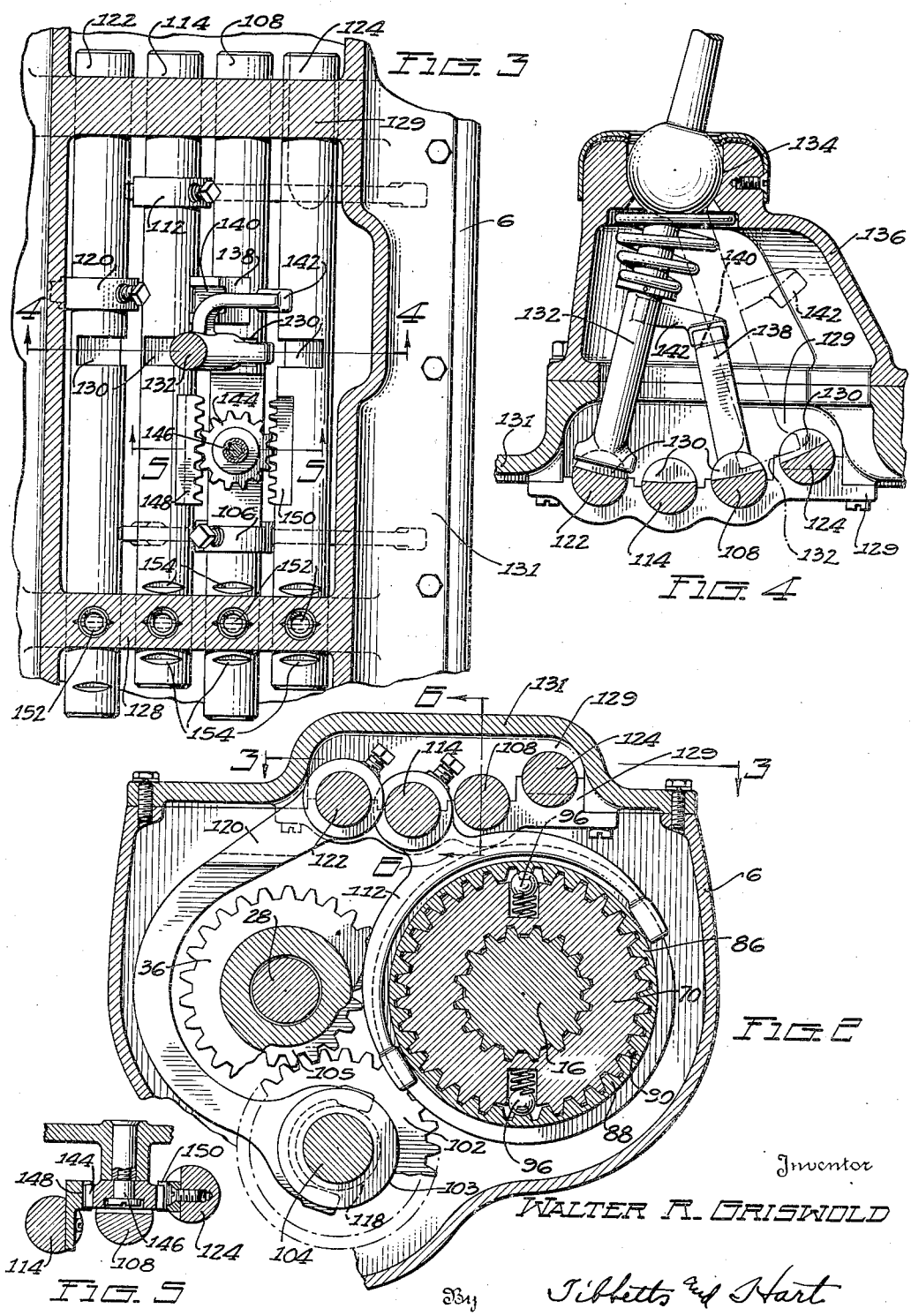

2,106,841

UNITED STATES PATENT OFFICE 2,106,841

MOTOR VEHICLE

Walter R. Griswold, Detroit, Mich., assignor to Packard Motor Car Company, Detroit, Mich., a corporation of Michigan Application March 6, 1935, Serial No. 9,616

10 Claims. (Cl. 74—375)

This invention relates to motor vehicles and more particularly to a variable speed transmission mechanism for such vehicles.

One object of the present invention is to improve the construction and mode of operation of variable speed transmission mechanisms for motor vehicles and to produce a transmission mechanism having a novel and improved construction and arrangement of parts for producing the various speed changes.

Another object of the invention is to devise a variable speed transmission mechanism for motor vehicles which will produce a greater number of speed changes than the conventional transmission mechanism and which is simple and compact in the construction and arrangement of parts and quiet in operation.

Another object of the invention is to devise a novel and improved variable speed transmission mechanism by which four variations in the speed of the drive in a forward direction and a reverse drive may be effected and in which the number of parts are reduced as compared with prior mechanisms for producing these variations in the drive, the parts are more compactly arranged than in such prior mechanisms and the structure and arrangement of the rotating elements and the bearings therefor are adapted to cause the mechanism to operate quietly at each of the several speeds.

With the above and other objects in view the invention consists in a variable speed transmission mechanism embodying the normal and improved features hereinafter described and particularly pointed out in the claims, the advantages of which will be readily understood and appreciated by those skilled in the art.

The various features of the invention will be clearly understood from the accompanying drawings illustrating the invention in its preferred form and the following detailed description of the constructions therein shown.

In the drawings Fig. 1 is a view in horizontal section illustrating a transmission mechanism embodying the invention.

Fig. 2 is a view in vertical section of the transmission mechanism taken substantially on the line 2—2 of Fig. 1.

Fig. 3 is a view in horizontal section taken substantially on the line 3—3 of Fig. 2 and illustrating particularly the shift mechanism.

Fig. 4 is a view in vertical section of the shift mechanism taken substantially on the line 4—4 of Fig. 3.

Fig. 5 is a detail sectional view taken substantially on the line 5—5 of Fig. 3.

Fig. 6 is a detail view in vertical section taken substantially on the line 6—6 of Fig. 2 and Fig. 7 is a diagrammatic view illustrating the several positions of the upper end of the gear shift lever respectively when the transmission mechanism is adjusted in neutral and in the several driving positions.

In the form of the invention illustrated in the drawings, the transmission mechanism comprises a driving shaft indicated at 2, journalled in bearings 4 supported in one end wall of the transmission housing 6. The driving shaft 2 is itself driven through the usual motor vehicle clutch. An intermediate shaft 8 has its left hand end portion telescoped within a cylindrical bore in the driving shaft 2 and is supported at its end by roller bearings 10 carried by the driving shaft and located adjacent the bearings 4, the intermediate shaft being arranged substantially in axial alignment with the driving shaft. The intermediate shaft 8 is supported at its other end by anti-friction bearings 12 carried by a web or flange 14 formed on the transmission housing. The transmission also comprises a driven shaft 16 having its left hand end portion telescoped within a cylindrical bore in the intermediate shaft 8 and supported at its end by roller bearings 18 carried by said intermediate shaft and located adjacent the bearings 12. The driven shaft is arranged substantially in axial alignment with the driving and intermediate shafts as is clearly shown and the other end thereof is journalled in anti-friction bearings 20 supported in the other end wall of the transmission housing. The above construction provides adequate bearings for supporting the driving, driven and intermediate shafts and misalignment of said shafts by reason of insufficiency of the bearing supports is prevented.

Mounted to turn loosely upon the driving shaft 2 adjacent the bearings 4 is a gear 22 which is constantly in mesh with a gear 24 fixed to a counter or lay shaft 26 journalled on a spindle 28 supported at its ends in the end walls of the transmission housing. As shown, the gear 22 is of less diameter than the gear 24 so that a speed reduction is produced in driving from the gear 22 to the gear 24.

The intermediate shaft 8 carries a gear 30 fixed to said shaft adjacent the bearings 12 and preferably integral with said shaft which is constantly in mesh with a gear 32 of greater diameter fixed to and preferably integral with the counter shaft 26. Thus a reduction in speed is produced in driving from the gear 30 to the gear 32 and an increase in speed is produced in driving from the gear 32 to the gear 30.

The driven shaft 16 carries a gear 34 mounted to turn loosely on said shaft at only a short distance from the bearings 20 which is constantly in mesh with a gear 36 of less diameter fixed to and preferably integral with the counter shaft 26. Thus a reduction in speed is produced in driving from the gear 36 to the gear 34.

By means of the above three pairs of gears the members of which are constantly in mesh, the driven shaft may be driven selectively at any one of four forward speeds. In order to connect the several pairs of gears to the driving and driven shafts in the manner required to produce the several changes in speed, a clutch device is provided to connect the gear 22 and the gear 30 alternatively to the driving shaft and a second clutch device is provided to clutch the gear 30 and the gear 34 alternatively to the driven shaft. Synchronizing means is associated with each of these clutch devices for synchronizing the rotation of each gear with relation to the shaft to which it is to be clutched before it is clutched to the latter shaft.

The clutch mechanism for clutching the gear 22 and the gear 30 alternatively to the driving shaft comprises a synchronizing member or sleeve 38 splined on the driving shaft 2 and movable axially of said shaft. The synchronizing member is provided with friction faces 40 and 42 arranged to engage alternatively friction faces 44 and 46 formed respectively on annular projections 48 and 50 extending laterally from the gear 22 and the gear 30, the synchronizing member having recesses 52 and 54 to receive respectively said projections. Mounted on the synchronizing member is a clutch ring 56 formed with internal teeth 58 intermeshing with external teeth 60 on the synchronizing member, the clutch ring being movable axially of said member. The internal teeth on the clutch ring are arranged to be carried by axial movement of the clutch ring on the synchronizing member into intermeshing engagement alternatively with clutch teeth 62 and 64 formed respectively on the gears 22 and 30 to clutch said gears alternatively to the synchronizing member and thereby to the driving shaft.

The synchronizing member is yieldingly held in its central position with relation to the clutch ring by means of a series of spring pressed retainer or detent balls 66 mounted in radial bores in the synchronizing member and arranged to engage respectively in recesses formed in one or more of the internal teeth on the clutch ring.

The gear synchronizing and clutch mechanism has the following mode of operation, starting with the parts in neutral positions as shown in Fig. 1. In clutching the gear 22 to the driving shaft 2, for example, the clutch ring 56 is shifted axially in a forward direction or to the left, Fig. 1. During the first part of this movement the friction surface 40 on the synchronizing member 38 is engaged with the friction surface 44 on the gear 22 and the gear is thereby caused to rotate at substantially the same speed as the driving shaft. The engagement of these friction surfaces limits the axial movement of the synchronizing member and the continued movement of the clutch ring, which is permitted by the yielding of the spring pressed balls 66, meshes the internal teeth on the ring with the teeth 62 on the gear 22 thereby clutching the gear to the driving shaft.

In unclutching the gear 22 from the driving shaft, the clutch ring 56 is shifted back rearwardly or to the right, Fig. 1, into neutral position. During this movement of the clutch ring, the internal teeth thereon are disengaged from the teeth 62 on the gear 22 and the synchronizing member 38 is moved rearwardly out of engagement with the friction surface 44 on the projection on said gear. When the clutch ring is restored to neutral position, the balls 66 carried by the synchronizing member engage in the recesses in the teeth of said ring and the synchronizing member is also restored to neutral position.

The synchronizing and clutch mechanism has a similar mode of operation in clutching the gear 30 to the driving shaft and in unclutching the gear therefrom, the clutch ring 56 being moved rearwardly to clutch said gear to the shaft and being moved back forwardly to unclutch said gear from the shaft.

A synchronizing and clutch mechanism is provided for connecting the gear 30 and the gear 34 alternatively to the driven shaft. This mechanism has substantially the same construction and arrangement of parts and mode of operation as the mechanism for connecting alternatively the gear 22 and the gear 30 to the driving shaft. This synchronizing and clutch mechanism comprises a synchronizing member 70 splined to the driven shaft 16 and movable axially of said shaft and provided with friction faces 72 and 74 arranged to engage alternatively friction faces 76 and 78 formed respectively on annular projections 80 and 82 extending laterally from a member 84 and from the gear 34 these projections engaging in recesses in the synchronizing member. The member 84 consists of a ring splined to a hollow portion of the intermediate shaft 8 which extends rearwardly beyond the bearings 12. Mounted on the synchronizing member 70 for movement axially thereof is a clutch ring 86 having internal teeth 88 intermeshing with external teeth 90 on the synchronizing member. The internal teeth on the clutch ring are also arranged to be carried by the axial movement of the clutch ring into intermeshing engagement alternatively with teeth 92 on the ring 84 and with teeth 94 on the gear 34.

The clutch ring is yieldingly held in a central position with relation to the synchronizing member by means of spring pressed detent balls 96.

In shifting the parts of the transmission mechanism into first speed positions, the clutch ring 56 is shifted rearwardly to clutch the gear 30 to the driving shaft and the clutch ring 86 is also shifted rearwardly to clutch the gear 34 to the driven shaft. The drive is then transmitted from the driving shaft through the synchronizing member 38 and clutch ring 56 to the gear 30 and through the gears 30 and 32 to the counter shaft 26. From the counter shaft the drive is transmitted through the gears 36 and 34, the clutch ring 86 and the synchronizing member 70 to the driven shaft. The pair of gears 30 and 32 and the second pair of gears 36 and 34 each produce a speed reduction.

In shifting the parts of the mechanism into second speed positions, the clutch ring 56 is shifted forwardly to clutch the gear 22 to the driving shaft and the clutch ring 86 is again shifted rearwardly to clutch the gear 34 to the driven shaft. The drive is then transmitted from the driving shaft 2 through the synchronizing member 38 and the clutch ring 56 to the gear 22 and through the gears 22 and 24 to the counter shaft 26. From the counter shaft the drive is transmitted through the gears 36 and 34 and the clutch ring 86 and synchronizing member 70 to the driven shaft. The reduction in speed produced by the pair of gears 22 and 24 is substantially less than the reduction produced by the pair of gears 30 and 32 so that the speed of the driven shaft is substantially greater than with the parts adjusted in the first speed positions.

In shifting the parts of the mechanism into third speed positions, the clutch ring 56 is shifted rearwardly to clutch the gear 30 to the driving shaft and the clutch ring 86 is shifted forwardly to clutch the member 84 to the driven shaft. The drive is then transmitted from the driving shaft through the synchronizing member 38 and clutch ring 56 to the gear 30 and thence through the intermediate shaft 8 to the member 84. From said member the drive is transmitted through the clutch ring 86 and the synchronizing member 70 to the driven shaft. This position of the parts produces a direct drive from the driving shaft to the driven shaft.

In shifting the parts of the mechanism into fourth speed positions the clutch ring 56 is shifted forwardly to clutch the gear 22 to the driving shaft and the clutch ring 86 is also shifted forwardly to clutch the member 84 to the driven shaft. The drive is then transmitted from the driving shaft through the synchronizing member 38 and clutch ring 56 to the gear 22 and through the gears 22 and 24 to the counter shaft 26. From the counter shaft the drive is transmitted through the gears 32 and 30 to the intermediate shaft 8 and thence through the member 84, the clutch ring 86 and the synchronizing member 70 to the driven shaft. The increase in speed produced by the pair of gears 32 and 30 is greater than the reduction in speed produced by the pair of gears 22 and 24 so that the driven shaft will be driven at a speed greater than the speed of the driving shaft.

In order to enable the shaft 16 to be driven in a rearward or reverse direction a gear 100 is fixed to said shaft and is arranged to be engaged by an idle gear 102 fixed to a sleeve 103 mounted to slide axially upon a shaft 104 supported at its ends in the web 14 and in the rear wall of the housing 6. The idle gear 102 is continuously in mesh with a gear 105 of considerably smaller diameter than the gear 100 fixed to the counter shaft 26. The sliding movements of the sleeve 103 upon the shaft 104 carries the gear 102 into and out of meshing engagement with the gear 100.

In shifting the parts of the mechanism into reverse positions, the clutch ring 56 is shifted rearwardly to clutch the gear 30 to the driving shaft and the sleeve 103 is also shifted rearwardly to mesh the gear 102 with the gear 100. The drive is then transmitted from the driving shaft 2 through the synchronizing member 38 and clutch ring 56 to the gear 30 and through the gears 30 and 32 to the counter shaft 26. From the counter shaft the drive is transmitted through the gears 105, 102 and 100 to the driven shaft.

The clutch ring 56 is shifted by means of a shifter fork 106 fixed to a longitudinally movable shift rod 108 and engaging in a groove 110 in the clutch ring. The clutch ring 86 is shifted by means of a shifter fork 112 fixed to a longitudinally movable shift rod 114 and engaging in a groove 115 in the ring. The sleeve 103 is shifted to shift the gear 102 by means of a shifter fork 120 fixed to a longitudinally movable shift rod 122 and engaging in a groove 118 in the sleeve. A fourth longitudinally movable shift rod 124 is provided for moving the shift rod 114 in directions reverse to the movement of the lower end of the gear shift lever under certain conditions.

The shift rods are mounted for longitudinal movement in guide members 128 and 129 carried by the cover 131 of the transmission housing and each rod is provided with a groove 130 arranged to receive the lower end of a gear shift lever 132. The lower end of said lever 132 is shaped as shown in Fig. 4 so that it may be engaged simultaneously in the grooves 130 in two adjacent shift rods. This lever is mounted for universal movement by means of a universal joint 134 upon a hollow support 136 secured to and projecting upwardly from the cover of the transmission housing, the lever extending through an opening in said cover. The shift rods are arranged on an arc having its center at the center of the universal joint 134 as shown in Fig. 4. The shift rod 108 is provided with a projection or arm 138 extending upwardly therefrom and having at its upper end a recess 140 arranged to receive the end of an arm 142 on the gear shift lever when said lever is in a certain position.

In order to connect the shift rods 124 and 114 so that movement of the former in one direction will produce movement of the latter in the opposite direction, a pinion 144 is rotatably mounted upon a bearing screw 146 secured to the cover of the transmission housing and said pinion meshes respectively with a rack 148 secured to the rod 114 and with a rack 150 secured to the rod 124.

In shifting the parts of the gear shift mechanism into first speed positions, the shift rod 108 and the fork 106 are shifted rearwardly and the shift rod 114 and the fork 112 are also shifted rearwardly. This movement of the rods is produced by engaging the lower end of the gear shift lever 132 in the grooves 130 in the rods 108 and 114 and then moving said lever to carry the lower end thereof rearwardly. In moving the parts of the gear shift mechanism to shift the same into second speed positions, the shift rod 108 and the shift fork 106 are moved forwardly and the shift rod 114 and the shift fork 112 are moved rearwardly. In order to effect this movement of the shift rods, the gear shift lever is adjusted to engage the lower end thereof in the grooves 130 in the shift rods 108 and 124 and said lever is then actuated to carry the lower end thereof forwardly. This movement of the lever will move the rod 114 rearwardly through the action of the pinion 144. In moving the parts of the gear shift mechanism to shift into third speed position, the shift rod 108 and the shift fork 106 are moved rearwardly and the shift rod 114 and the fork 112 are moved forwardly. This movement of the shift rods is produced by adjusting the gear shift lever to engage the lower end thereof in the recesses in the rods 108 and 124 and then actuating said lever to carry the lower end thereof rearwardly. This movement of the rod 124 will move the rod 114 forwardly through the action of the pinion 144. In adjusting the parts of the gear shift mechanism to shift into fourth speed positions the shift rod 108 and the fork 106 are moved forwardly and the rod 114 and the fork 112 are also moved forwardly. This movement of the shift rods is produced by adjusting the gear shift lever to engage the lower end thereof in grooves 130 in the rods 108 and 114 and then moving said lever to carry the lower end thereof forwardly.

In adjusting the parts of the gear shift mechanism to shift into reverse, the rod 108 and the fork 106 are moved rearwardly and the rod 122 and the fork 120 are also moved rearwardly. These movements of the shift rods are produced by adjusting the gear shift lever to engage the lower end thereof in the groove 130 in the rod 122 and to engage the end of the arm 142 in the recess in the outer end of the arm 138 and then moving the said lever to carry the lower end thereof rearwardly.

In order to hold yieldingly each shift rod in neutral position and in each of its operative positions a spring pressed ball 152 is mounted in the upper bearing or guide member 128 opposite each of the shift rods and is arranged to engage in recesses 154 formed in the rod. Each of these recesses corresponds either with the neutral position or with one of the operative positions of the rod.

Fig. 7 shows diagrammatically the several positions of the ball at the upper end of the gear shift lever when the lever is in neutral and in the various speed positions.

It will be noted that the structure and arrangement of the aligned shafts, the bearings therefor, the gears carried by said shafts and the synchronizing and clutch members are particularly compact so that the gears, clutch and synchronizing members occupy a relatively small space longitudinally of the transmission. The constantly meshing gears 22, 24, 30, 32, 34 and 36 are preferably helical gears so that they operate quietly. The location of the bearings 4, 12 and 20 respectively adjacent the gears on the aligned shafts tends to cause a quiet operation of the several pairs of gears through which the various speed changes are produced. The bearing structure for the aligned shafts is especially simple, the three bearings 4, 12 and 20 supporting one end of the driving shaft 2 and entirely supporting the intermediate and driven shafts.

It is to be understood that the invention is not limited to the particular construction and arrangement of parts of the illustrated embodiment of the invention but that the invention may be embodied in other forms within the scope of the claims.

Having explained the nature and object of the invention and having specifically described a construction embodying the invention in its preferred form what is claimed is:

1. A transmission mechanism comprising a housing, a driving shaft, a bearing for said shaft carried by one end wall of the housing, an intermediate shaft in alignment and telescoping with the driving shaft, a bearing carried by the driving shaft for supporting one end of the intermediate shaft, a bearing carried by the housing for supporting the other end of the intermediate shaft, a driven shaft in alignment and telescoping with the intermediate shaft, a bearing carried by the intermediate shaft for supporting one end of the driven shaft, a bearing carried by the other end wall of the housing for supporting the other end of the driven shaft, change speed gearing for connecting said shafts including a gear loosely mounted on the driving shaft adjacent said first bearing, a gear fixed to the intermediate shaft adjacent the second intermediate shaft bearing, a gear loosely mounted on the driven shaft, gears arranged to mesh respectively with said above mentioned gears and means for controlling the gear connections between the shafts.

2. A transmission mechanism comprising a housing, a driving shaft, an intermediate shaft in alignment and telescoping with the driving shaft, a driven shaft in alignment and telescoping with the intermediate shaft, change speed gearing for connecting said shafts including a gear carried by the driving shaft, a second gear carried by the intermediate shaft, a third gear carried by the driven shaft, an axially movable synchronizing member mounted on the driving shaft between said first two gears for rotation with said shaft and arranged in telescoping relation with the adjacent portions of said gears, friction faces formed respectively on the telescoping portions of said synchronizing member and said first two gears for engagement to synchronize the rotation of the gears with the driving shaft, a clutch member mounted on said synchronizing member for axial movement therewith and movable axially of said synchronizing member for clutching alternatively said first two gears to the driving shaft, an axially movable synchronizing member mounted on the driven shaft between the second and third gears for rotation with the shaft and arranged in telescoping relation with the adjacent portions of said gears, friction faces formed respectively on the telescoping portions of the synchronizing member and the latter two gears for engagement to synchronize the rotation of the gears with the driven shaft, a clutch member mounted on the latter synchronizing member for axial movement therewith and movable axially of said synchronizing member for clutching the latter two gears alternatively to the driven shaft, gears meshing respectively with said above mentioned gears and means for controlling the said synchronizing and clutch members.

3. A transmission mechanism comprising a driving shaft, an intermediate shaft in alignment with the driving shaft, a driven shaft in alignment with the intermediate shaft, change speed gearing for connecting said shafts including a gear mounted to rotate on the driving shaft, a second gear carried by the intermediate shaft, a third gear carried by the driven shaft, an axially movable clutch member mounted on the driving shaft between said first two gears for rotation with said shaft, a second axially movable clutch member mounted on the driven shaft between the second and third gears for rotation with the driven shaft, a gear shift member and means operated by said member during a gear shift movement thereof for moving said clutches simultaneously to shift the gear connections between the shafts.

4. A transmission mechanism comprising a driving shaft, an intermediate shaft in alignment with the driving shaft, a driven shaft in alignment with the intermediate shaft, change speed gearing for connecting said shafts including a gear mounted to rotate on the driving shaft, a second gear carried by the intermediate shaft, a third gear carried by the driven shaft, an axially movable clutch member mounted on the driving shaft between said first two gears for rotation with said shaft, a second axially movable clutch member mounted on the driven shaft between the second and third gears for rotation with the driven shaft, a gear shift member and devices operated by said member for moving said clutches simultaneously in the same direction or simultaneously in reverse directions selectively.

5. A transmission mechanism comprising a driving shaft, an intermediate shaft in alignment with the driving shaft, a driven shaft in alignment with the intermediate shaft, change speed gearing for connecting said shafts including a gear mounted to rotate on the driving shaft, a second gear fixed to the intermediate shaft, a third gear mounted to rotate on the driven shaft, an axially movable clutch member mounted on the driving shaft between said first two gears for rotation with said shaft, a second axially movable clutch member mounted on the driven shaft between the second and third gears for rotation with the driven shaft and a synchronizing device associated with each of said clutch members having friction surfaces for engaging and causing each of said gears to rotate substantially at the speed of rotation of the clutch member before the clutch member is positively engaged therewith.

6. A transmission mechanism comprising a driving shaft, an intermediate shaft in alignment with the driving shaft, a driven shaft in alignment with the intermediate shaft, change speed gearing for connecting said shafts including a gear mounted to rotate on the driving shaft, a second gear fixed to the intermediate shaft, a third gear mounted to rotate on the driven shaft, an axially movable clutch member mounted on the driving shaft between said first two gears for rotation with said shaft, a second axially movable clutch member mounted on the driven shaft between the second and third gears for rotation with the driven shaft, a synchronizing device associated with each clutch member having surfaces for frictionally engaging each gear and speeding up or slowing down the same to the rotation of the clutch member before the clutch member is positively engaged therewith.

7. A transmission mechanism comprising a driving shaft, an intermediate shaft and a driven shaft all arranged in alignment, change speed gearing for connecting said shafts including a gear loosely carried by the driving shaft, a second gear fixed to the intermediate shaft, a third gear loosely carried by the driven shaft, a clutch for connecting the first gear and the second gear alternatively to the driving shaft, a clutch for connecting the second gear and the third gear alternatively to the driven shaft, a gear shift member and means operated by said member for moving said clutches simultaneously to clutch and unclutch the respective shafts and gears.

8. A transmission mechanism comprising a driving shaft, an intermediate shaft and a driven shaft all arranged in alignment, three gears carried respectively by said shafts, a counter shaft, three gears carried by the counter shaft and constantly in mesh respectively with the above mentioned gears, a reverse gear fixed to the driven shaft, a reverse gear fixed to the counter shaft, an idle gear arranged to mesh with said reverse gears and means for controlling the gear connections between the shafts.

9. A transmission mechanism comprising a driving shaft, an intermediate shaft and a driven shaft all arranged in alignment, a gear loose on the driving shaft, a second gear fixed to the intermediate shaft, a third gear loose on the driven shaft, a counter shaft, three gears fixed to the counter shaft and constantly in mesh respectively with the first three gears, means for connecting the first two gears alternatively to the driving shaft, means for connecting the second and third gears alternatively to the driven shaft, a reverse gear fixed to the driven shaft, a reverse gear fixed to the counter shaft, a shiftable idle gear arranged to mesh with said reverse gears and means for controlling the gear connections between the shafts.

10. A transmission mechanism comprising a driving shaft, an intermediate shaft, a driven shaft, said shafts being in alignment, a gear loosely mounted on said driving shaft, a gear fixed on said driven shaft, a counter shaft, a gear fixed on said counter shaft meshing with the gear on said driving shaft, a reverse idle gear, a second gear on said counter shaft meshing with said idle gear, means for shifting said idle gear into and out of mesh with the gear on said driven shaft while in mesh with the gear on said counter shaft, and clutch means shiftable to selectively drivingly connect said driving shaft with said intermediate shaft or to drivingly connect said loosely mounted gear with said driving shaft.

WALTER R. GRISWOLD.